(No Model.)
F. W. CALAIS & S. M. BARNES.
TRUCK FOR MOVING HARVESTERS.
No. 265,574. Patented Oct. 10, 1882.
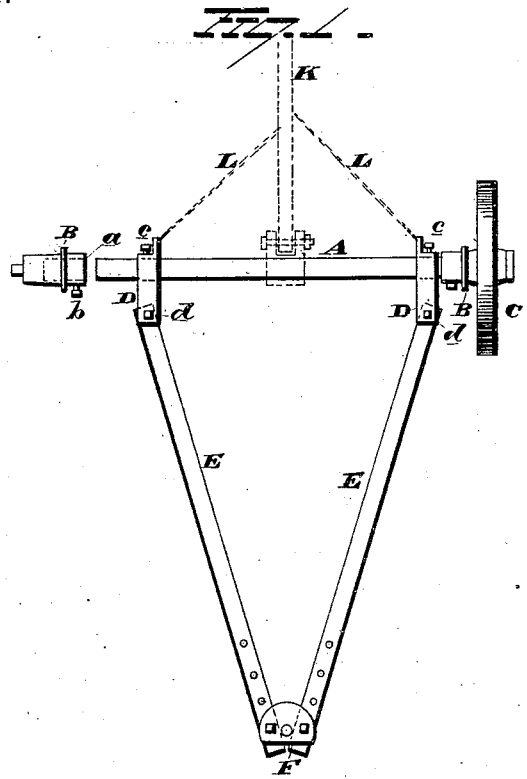
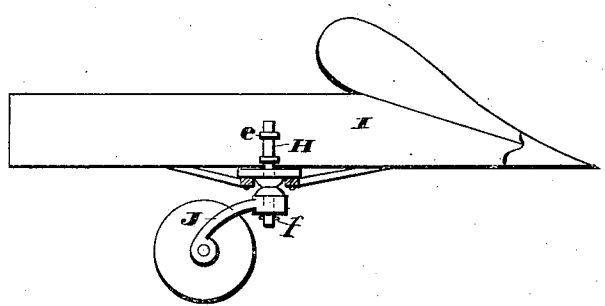
WITNESSES
S. G. Nottingham.
Geo. F. Downing.
INVENTOR
F. W. Calais.
S. M. Barnes
By H. A. Seymour Attorney

UNITED STATES PATENT OFFICE.

FRANK W. CALAIS, OF LINCOLN, AND SAMUEL M. BARNES, OF FAIRBURY, ILL.

TRUCK FOR MOVING HARVESTERS.

SPECIFICATION forming part of Letters Patent No. 265,574, dated October 10, 1882.

Application filed May 29, 1882. (No model.)

To all whom it may concern:

Be it known that we, FRANK W. CALAIS, of Lincoln, in the county of Logan and State of Illinois, and SAMUEL M. BARNES, of Fairbury, in the county of Livingston and State of Illinois, have invented certain new and useful Improvements in Trucks for Moving Harvesters; and we do hereby declare the following to be a full, clear, and exact description of the invention, such as will enable others skilled in the art to which it pertains to make and use the same.

Our invention relates to an improvement in trucks adapted more particularly for use in transporting harvesters from field to field through ordinary gateways and over narrow bridges; and it consists in certain details in construction and combinations of parts, as will be more fully described, and pointed out in the claims.

In the accompanying drawings, Figure 1 is a plan view of our improvement, and Fig. 2 is an end view, showing the manner of securing the caster-wheel in position.

A represents a suitable metallic axle, preferably made of gas-pipe, and B are socketed axle-spindles adapted to be removably secured to the said axle. Each spindle B is provided at its inner end with a socket, a, of size sufficient to admit the outer free ends of the axle A, and with a set-screw, b, by means of which the spindle is retained on the said axle. The chambers or sockets of these spindles are of considerable length, which enables a variable lateral adjustment of the spindles on the axles, and consequently allows machines of different width to be placed on the truck without interfering with the truck-wheels. The wheels C are secured to the spindles B in any suitable manner, and by simply loosening the set-screw b the said wheels C can be removed from the axle A, with the spindles secured in position therein.

The advantages of the above construction of parts are, first, its adaptation to lateral adjustment on the axle A permits a standard length of axle to be used on machines of different sizes; second, greater convenience in moving the wheels C, and avoiding annoyance from the lubricants on the spindles, and preserving the lubricants intact while the wheels are removed; third, it is of more economical construction; and, fourth, when the axle A is permanently attached to the binder, as shown in T. A. Jones's patent, No. 256,484, the weight of the parts while the machine is operating as a harvester is materially lessened. The axle A can be removably secured to the harvester, or permanently attached thereto, as shown in the said Jones's patent.

The axle A, as before stated, can form a part of the harvester-frame or be removably secured thereto, as desired; but when the truck forms a unitary structure—that is to say, when the axle is not rigidly secured to the harvester-frame—it need not be removably secured thereto, unless so desired, as the weight of the harvester is sufficient to keep it in position thereon without danger of being disconnected. In either case, however, the axle can be placed either to the right or left of the bull or ground wheel, as desired. This axle A is inclosed by one or more collars, D, the latter adapted to be removably held in position thereon by the set-screws c. Each collar D is provided with the rearwardly-extending arms d, between which the front ends of the reach bar or bars E are pivotally secured. The rear ends of these reach-bars E are pivotally connected to the perforated plate F, in which the caster-wheel G is secured. This plate F is provided with perforations, by means of which the reach bar or bars are secured thereto, and with one central perforation, through which the caster-spindle passes.

The caster-spindle H passes up through the central hole in the plate F, and is firmly held in position and prevented from moving by the staples e, which secure it firmly against the outside of the finger-board I, as shown in Fig. 2. The lower or cylindrical end of the spindle H passes through a hole in the hub of the yoke J, and is secured in position therein by the pin f. The caster-wheel and yoke, being thus pivotally connected to the spindle H below the harvester-frame, are enabled to freely turn without interference.

From the foregoing it will be seen that the parts above enumerated form a complete truck, onto which the harvester is loaded in the following manner: The bars E are first detached from the plate F, and the axle A, with the wheels and spindles removed, is placed either to the inside or outside of the ground-wheel. The bars E E, having been adjusted on the axle so as to enable the ground-wheel of the harvester to rest between them, are now carried inward toward each other, and are secured in the positions shown in Fig. 1 to the plate F. The spindle, with its connected parts, is then secured in position, as before described, and the machine is elevated, as specified in the Jones patent before referred to, or in any suitable manner, so as to enable the spindles B, with their connected wheels, to be secured to the axle A, and the machine is ready to be transported endwise as soon as the draft-tongue is secured in position. The plate F is adjusted on the bars E to suit machines of different sizes.

The draft-tongue K, which is a part of the harvester, is adapted to be either secured to the axle A, as shown in Fig. 1, or directly to the harvester, as shown in the Jones patent. When the axle A forms a part of the harvester or is rigidly secured thereto the tongue K is removed from the front of the machine and secured to the side thereof, and when the axle is removably secured to the frame, and is placed on the outside of the ground-wheel and parallel thereto, the tongue K can be removably secured to the said axle or to the end of the harvester. The tongue, when secured to the axle, is allowed a free vertical movement at its free front end, and is strengthened and held in position by the braces L. These braces L are provided with hooks on their front ends to engage eyes or staples secured to the tongue, and also with hooks at their rear ends to engage eyes secured either to the harvester or to the axle, so as to be on a line with the tongue, and thereby enable the latter to have a free vertical movement, but at all times be securely braced in position. The truck above described is intended to move harvesters sidewise, or in the direction of its longest length, so as to enable it to pass through ordinary gates without removing or disconnecting any part of the harvester.

The construction of parts above described is easily attached to and removed from a harvester, can be manufactured at a small initial cost, and is adapted for machines of all shapes and sizes.

It is evident that numerous changes in the construction and relative arrangement of the several parts might be resorted to without departing from the spirit of our invention, and hence we would have it understood that we do not limit ourselves to the exact construction shown and described, but consider ourselves at liberty to make such changes as come within the spirit and scope of our invention.

Having fully described our invention, what we claim as new, and desire to secure by Letters Patent, is—

1. In a truck for moving harvesters, the combination, with an axle, of two reach-bars, an adjustable plate secured between said bars, and a caster-wheel adapted to pass through said plate, substantially as set forth.

2. In a truck, the combination, with the axle, removable spindles, and wheels, of reach-bars pivotally connected to the axle, an adjustable plate secured between said bars, and a caster-wheel whose spindle passes through said plate, substantially as set forth.

3. In a truck for moving harvesters, the combination, with an axle adapted to be removably secured to the under side of the harvester parallel with the ground-wheel thereof, and wheels removably secured on the said axle at right angles to the said ground-wheel, of a plate connected to the said axle by suitable reach bar or bars, caster-wheel, yoke, and spindle adapted to pass through the said plate and be secured to the finger-bar of the harvester, substantially in the manner described.

4. In a truck for moving harvesters, the combination, with the axle and wheels, of collars adjustably secured to the said axle, reach-bars, the front ends of which are pivotally connected to the said collars, a plate connected to the rear ends of the said reach-bars, and a caster-wheel secured to the said plate, all of the above parts adapted to operate as described.

5. The combination, with the axle, a tongue pivotally secured thereto, collar or collars adjustably secured thereon, and spindles and wheels removably secured thereto, of reach bar or bars pivotally connected at one end to the said collar or collars, a plate adjustably secured to the said bar or bars at their rear ends, and a caster-wheel pivotally secured to the said plate.

In testimony whereof we have signed this specification in the presence of two subscribing witnesses.

FRANK W. CALAIS.
SAMUEL M. BARNES.

Witnesses:
OSCAR F. AVERY,
S. E. SIMS.